United States Patent [19]

Marion

[11] Patent Number: 5,613,655
[45] Date of Patent: Mar. 25, 1997

[54] METHOD AND APPARATUS FOR A DOUBLE CLASP RETENTION CLIP

[75] Inventor: James E. Marion, Bonfield, Ill.

[73] Assignee: Illinois Tool Works Inc., Glenview, Ill.

[21] Appl. No.: 600,519

[22] Filed: Feb. 13, 1996

[51] Int. Cl.$^6$ ................................................ F16L 3/12
[52] U.S. Cl. .................. 248/68.1; 248/74.3; 248/316.5; 24/543; 24/339
[58] Field of Search .............................. 24/543, 518, 487, 24/339; 248/68.1, 49, 74.2, 316.5, 74.3

[56] References Cited

U.S. PATENT DOCUMENTS

| | | | |
|---|---|---|---|
| 3,854,482 | 12/1974 | Laugherty et al. | 24/543 X |
| 4,193,174 | 3/1980 | Stephens . | |
| 4,220,301 | 9/1980 | Jacobs et al. . | |
| 4,623,102 | 11/1986 | Hough, Jr. | 248/74.3 X |
| 4,669,156 | 6/1987 | Guido et al. | 248/74.3 X |
| 4,775,121 | 10/1988 | Carty | 248/316.5 X |
| 4,881,705 | 11/1989 | Kraus . | |
| 5,251,861 | 10/1993 | Hayashi | 248/74.3 X |
| 5,257,768 | 11/1993 | Juenemann et al. . | |
| 5,301,917 | 4/1994 | Dyer . | |
| 5,423,831 | 6/1995 | Nates . | |

FOREIGN PATENT DOCUMENTS

| | | | |
|---|---|---|---|
| 3918440 | 2/1990 | Germany | 248/74.3 |

Primary Examiner—Peter M. Cuomo
Assistant Examiner—Hanh V. Tran
Attorney, Agent, or Firm—Schwartz & Weinrieb

[57] ABSTRACT

A method and apparatus for releasably retaining and mounting an article such as tubular members. The apparatus includes a body member having an article retention portion for capturing an article and a mounting surface. A hinged cover is releasably disposable over the article retention portion of the body member for releasably retaining an article captured in the article retention portion of the body member. A first engagable clasp having a first latching surface is disposed on a second end portion of the cover and a first latch engaging surface is disposed on the body member, wherein the first latching surface is engagable with the first latch engaging surface when the cover is disposed over the article retention portion of the body member. A second engagable clasp having a second latching surface is disposed on the body member and a second latch engaging surface is disposed on the second end portion of the cover, wherein the second latching surface is engagable with the second latch engaging surface when the cover is disposed over the article retention portion of the body member. The first latching surface and the second latch engaging surface on the cover extend away from one another, and the second latching surface and the first latch engaging surface on the body member extend toward one another to prevent inadvertent release of the cover form the body member.

20 Claims, 1 Drawing Sheet

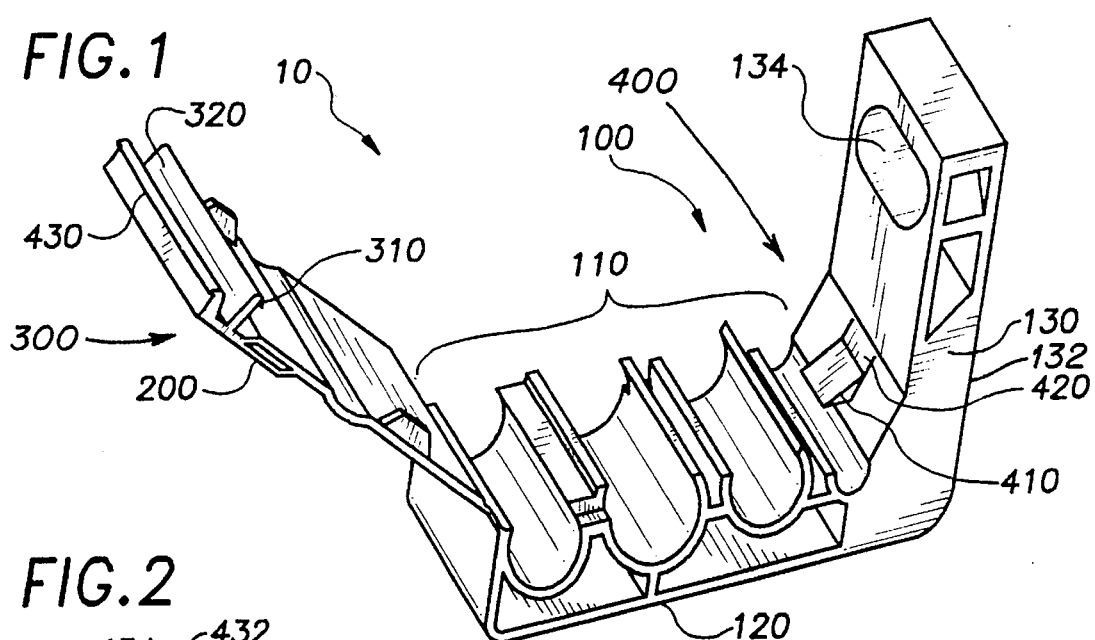
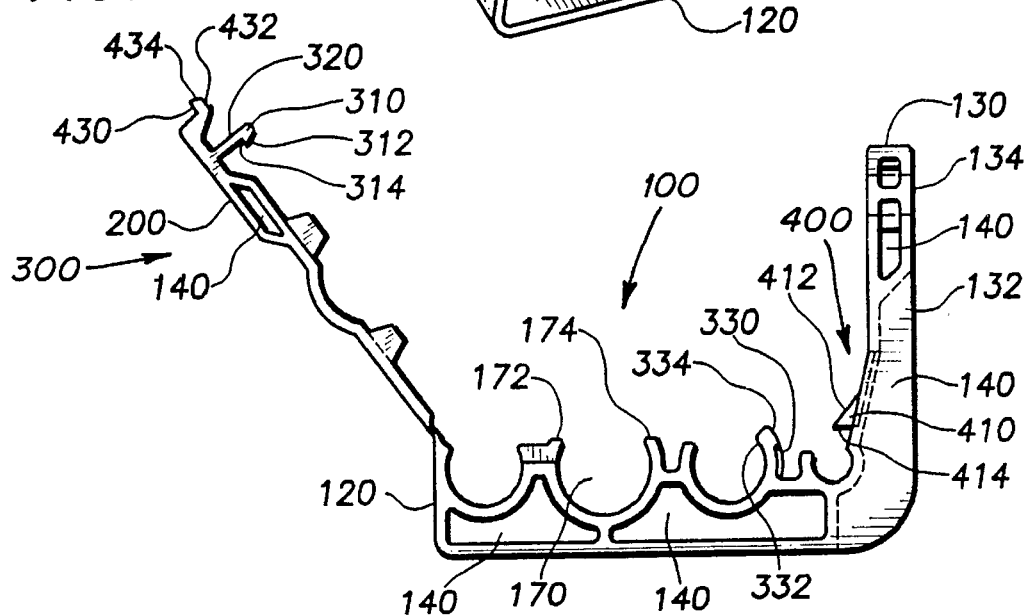
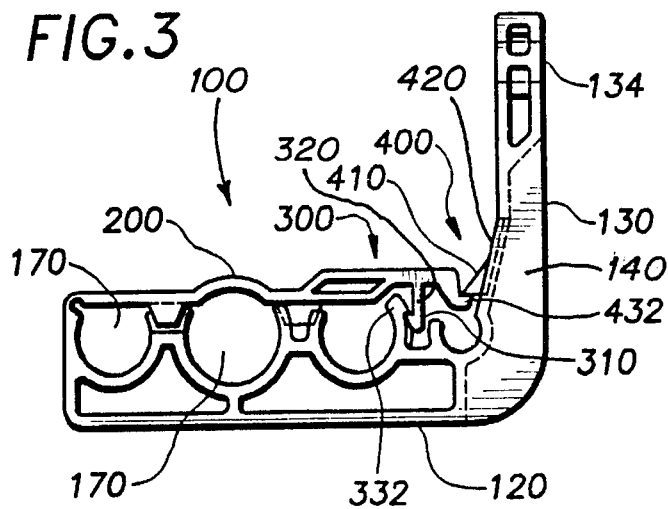
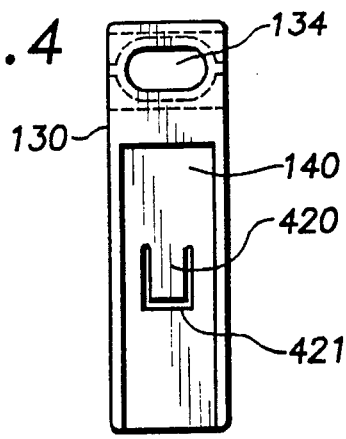

METHOD AND APPARATUS FOR A DOUBLE CLASP RETENTION CLIP

FIELD OF THE INVENTION

The invention generally relates to a method and apparatus for mountable retention clips usable to retain tubular members, and more particularly to unitary retention clips having a cover foldable over tubular members captured by corresponding tube retention members disposed on a base of a body member wherein the cover is releasably securable to the base member by a clasp.

BACKGROUND OF THE INVENTION

Mountable retention clips that retain tubular members have many well known applications and are enormously successful in the market place. In the automobile industry for example these clips are used to retain and mount a variety of tubular members including brake lines, fuel lines and electrical cable bundles to a mounting member such as a chassis or unibody structure. The clips are generally formed of a plastic material to reduce weight and cost. In some applications, the clips are first mounted on the mounting member and then the tubular members are retained in the mounted clips. In other applications, tubular members are first retained in several clips to form an assembly, which is later mounted on a mounting member such as automobile frame. U.S. Pat. No. 4,881,705 to Kraus for example discusses a plastic holding element having a hinged cover part that is closable over tubular members retained by a separate inlay part housed in a base part. The cover part is closed over the base part and secured in the closed position by a single resilient catch. The separate inlay however requires additional fabrication and subsequent assembly, which increases costs. The single catch is also susceptible to failure during handling of holding elements assembled with tubular members before mounting and when subject to vibrational stress after mounting. The single catch of course may be made more reliable by increasing its contact surface areas to increase the holding force on the cover pan. This solution however the requires additional material to fabricate the catch, which disadvantageously increases the overall size and weight of the clip. Moreover, an enlarged catch requires exertion of additional force or pressure to fasten the catch, which when performed manually is a known cause of physical fatigue and a suspected cause of carpel tunnel syndrome and other debilitating maladies.

Others have endeavored to improve the reliability of the clip by increasing the holding force on the cover part with additional separate components. U.S. Pat. No. 5,301,831 to Dyer for example discusses a clip having a cover with resilient edge portions that snap fit over edges of a flange on a U-shaped housing. A fastening member is disposed through an aperture through both the cover and the flange to mount the housing to a mounting surface and secure the cover to the flange. This type of clip however can not be mounted on the mounting surface until after inserting the tubular members into the housing and closing the cover over the flange. Also, the housing must be removed from the mounting surface before opening the cover from the flange to gain access to the tubular members. In addition, the resilient cover is susceptible to inadvertent opening during handling and installation since an opening force on the cover has a tendency to unsnap both resilient edges of the cover from the flange. U.S. Pat. No. 5,423,831 to Nates discusses a disposable clamp with improved latching performance, but the amount of pressure required to manually latch the clamp is a source of physical fatigue. Further, the clamp is specifically intended for stemming the flow of blood through a mammalian umbilical cord after birth and for safety purposes has the disadvantage that the latch must be destroyed to open the clamp, which is preferably removed only upon natural separation of the umbilical cord.

OBJECTS OF THE INVENTION

In view of the discussion above, there exists a demonstrated need for an advancement in the art of mountable retention clips usable for retaining articles such as tubular members. It is therefore an object of the invention to provide a novel method and apparatus for a retention clip that overcomes the problems with the prior art.

It is also an object of the invention to provide a novel method and apparatus for a retention clip that is light weight and economical to fabricate.

It is another object of the invention to provide a novel method and apparatus for a retention clip having a cover disposable over articles, such as tubular members, captured by corresponding article retention members on a base wherein the cover is releasably securable to the base by first and second cooperating clasps.

It is still another object of the invention to provide a novel method and apparatus for a retention clip having a cover releasably securable to a base by first and second clasps wherein both clasps must be simultaneously disengaged to release the cover from the base.

It is a further object of the invention to provide a novel method and apparatus for a retention clip having a cover foldable over tubular members captured by corresponding tube retention members on a base wherein the cover is closable and openable over the base without regard to whether the retention clip is mounted on a mounting member.

SUMMARY OF THE INVENTION

Accordingly, the present invention comprises a novel method and apparatus for releasably retaining and mounting an article. The apparatus includes a body member having an article retention portion for capturing an article and a mounting surface. A cover is releasably disposable over the article retention portion of the body member for releasably retaining an article captured in the article retention portion of the body member. In one embodiment, a first end of the cover is hinged to the body member. A first engagable clasp having a first latching surface is disposed on a second end portion of the cover and a first latch engaging surface is disposed on the body member, wherein the first latching surface is engagable with the first latch engaging surface when the cover is disposed over the article retention portion of the body member. The first latching surface is disposed on a first resilient arm extending from the second end portion of the cover and the first latch engaging surface is disposed on a first flange on the body member. The first flange also has a first bevelled surface for contacting the first tab of the cover and flexing the first resilient arm to permit engagement of the first latching surface with the first latch engaging surface. A second engagable clasp having a second latching surface is disposed on the body member and a second latch engaging surface is disposed on the second end portion of the cover, wherein the second latching surface is engagable with the second latch engaging surface when the cover is disposed over the article retention portion of the body member. The second latching surface is disposed on a second resilient arm extending from the body member and the second latch engaging surface is disposed on a second flange on the second end portion of the cover. The second flange has a second bevelled surface for contacting the second tab of the body member and flexing the second resilient arm of the body members so as to permit engagement of the second latching surface with the second latch engaging surface. The first latching surface and the second latch engaging surface on the cover extend away from one another, and the second latching surface and the first latch engaging surface on the body member extend toward one another so as to prevent inadvertent release of the cover from the body member. In one embodiment, the body member is an L-shaped member with a base leg and a mounting leg, and the article retention portion is a tube retention member having a partially cylindrical cavity formed by outwardly flexible resilient wall portions that permit insertion of a tubular member into the cavity, and thereafter the resilient wall portions snap toward one another so as to capture the tubular member in the cavity.

BRIEF DESCRIPTION OF THE DRAWINGS

These and other objects, features and advantages of the present invention will become more fully apparent upon consideration of the following Detailed Description of the Invention with the accompanying drawings, which may be disproportionate for ease of understanding, in which like structure and steps are referenced by corresponding numerals and indicators throughout the several views, and wherein:

FIG. 1 is a perspective view of a double clasp retention clip having a cover releasably securable over a body member according to an exemplary embodiment of the invention having tube retention members disposed on the body member.

FIG. 2 is a side view of the double clasp retention clip according to the exemplary embodiment of FIG. 1.

FIG. 3 is a wide view of the double clasp retention clip of FIG. 2 wherein the cover is folded and secured over the body member.

FIG. 4 is an end view from the right side of the double clasp retention clip of FIG. 3.

DETAILED DESCRIPTION OF THE INVENTION

FIGS. 1–4 illustrate a retention clip 10 having a body member 100 with a hinged cover 200 releasably securable over an article retention portion of the body member. The cover 200 is coupled to the body member 100 at a first end by a hinge, and is foldable over the article retention portion of the body member 100 so that a second end of the cover 200 is releasably securable to the body member 100 by a first engagable clasp 300 and a second engagable clasp 400 shown engaged or locked in FIG. 3. The clasps 300 and 400 are engagable with a low force to secure the cover 200 to the body member 100, and are disengagable only with a comparatively high force to release the cover 200 from over the body member 100 as discussed below. In an alternative embodiment, the cover 200 may be fastened over the article retaining portion of the body member 100 by replacing the hinge with additional clasps. The retention clip 10 is preferably fabricated as a unitary member with a flexible hinge formed in a molding process from a material such as acetal, nylon, polyesters, and poly-carbonate among other plastic materials that are sufficiently resilient for operation of the hinge and clasps 300 and 400 as discussed below yet provide adequate tensile and shear performance for its particular application. The clip 10 may alternatively be a multi-component article having at least a separate body member 100 and cover 200 fabricated from one of the above materials or from a metal sufficiently resilient to permit operation of at least the clasps 300 and 400. In this alternative embodiment, the hinge may be a separate component or be replaced with additional clasps.

In the exemplary embodiment of FIGS. 1–4, the body member 100 is an L-shaped member having a base leg 120 and a mounting leg 130, but may in general have a variety of different shapes including a substantially linear strip, an inverted V-shaped member and a T-shaped member, which shapes are configured for specific applications and mounting surfaces. In the exemplary embodiment, the article retention portion 110 of the body member 100 is disposed on the base leg 120 and comprises a bank of at least one tube retention member for receiving a tubular member not shown in the drawing. The exemplary tube retention members each includes a partially cylindrical cavity 170 formed by resilient wall portions 172 and 174 that are outwardly flexible to permit insertion of the tubular member into the cavity 170, and thereafter the resilient wall portions 172 and 174 snap toward one another to capture the tubular member in the cavity 170. The article retention members are preferably formed as a unitary member 100 with the body member, but alternative embodiments may include retention members, including separate retention members, for retaining articles other than tubular members. The mounting leg 130 includes a mounting surface 132 for mounting the clip 10 to a mounting member, not shown in the drawing, and an aperture 134 through which a fastening member such as an expandable fastener, compressible load bearing fastener, bolt, pin, or rivet not shown in the drawing is insertable to mount the clip 10 onto the mounting member. The aperture 134 may have an oval shape as shown to permit positioning of the clip 10 after mounting on the mounting surface or to permit expansion of a compressible load bearing fastener. In an alternative embodiment, the mounting surface 132 and aperture 134 may be on the base leg of a substantially linear body member. The body member 100 and cover 200 of the exemplary embodiment include several recessed or hollow portions 140 to reduce weight, which are located to minimize any compromise in the structural integrity of the retention clip 10.

In the exemplary embodiment, the cover 200 is foldable over the article retention portion 110 of the body member 100 and has at least one end that is securable or lockable to the body member 100 by the first and second clasps 300 and 400 so as to releasably retain the article captured in the article retention portion 110 of the body member 100. In the exemplary embodiment, the two clasps 300 and 400 are each disposed in part on a second end portion of the cover 200 and in part on the body member 110 wherein the first clasp 300 locks the cover 200 to the base leg 120 and the second clasp 400 locks the cover to the mounting leg 130. The first clasp 300 includes a first tab 310 disposed on a first resilient arm 320 extending from the second end portion of the cover 200 and a first latch engaging surface 330 disposed on the base leg 120 adjacent the mounting leg 130. The first tab 310 includes a first bevelled surface 312 and a first latching surface 314. The first latch engaging surface 330 is formed by a first flange 332 with a first bevelled surface 334 wherein the first latching surface 314 is engagable with the first latch engaging surface 330 so as to releasably retain the cover 200 folded over the article retention portion 110. The second clasp 400 includes a second tab 410 disposed on a second resilient arm 420 extending from the mounting leg 130 adjacent the base leg 120 and a second latch engaging surface 430 disposed on the second end portion of the cover 200. The second resilient arm 420 may be formed in the mounting leg 130 by horizontal pull during a molding process to form a U-shaped slot 421. The second tab 410 includes a second bevelled surface 412 and a second latching surface 414. The second latch engaging surface 430 is formed by a second flange 432 with a second bevelled surface 434 wherein the second latching surface 414 is engagable with the second latch engaging surface 430 so as to releasably retain the cover 200 folded over the article retention portion 110. The first and second clasps 300 and 400 are configured so that forces tending to disengage one clasp tend to engage the other clasp to decrease the likelihood that the cover 200 will be inadvertently released from the body member 100 as further discussed below. In the exemplary embodiment for example the first latching surface 314 and the second latch engaging surface 430 on the cover 200 extend away from one another in outwardly opposing directions, and the second latching surface 414 and the first latch engaging surface 330 on the body member 100 extend toward one another in inwardly opposing directions.

In one mode of operation, tubular members or other articles are disposed in and captured by the article retention portion 110 of the body member 100 as discussed above, which may or may not be mounted on a mounting member. The cover 200 is then releasably disposed over the article retention portion 110 of the body member 200 so as to releasably retain the articles in the article retention portion 110. In the exemplary embodiment, the cover 200 is foldable over the article retention portion 110 of the body member 100 so as to engage the first and second clasps 300 and 400. As the cover 200 is folded toward the article retention portion 110 of the body member 100 the first bevelled surface 312 of the first tab 310 contacts the first bevelled surface 334 of the first flange 332, which is substantially rigid relative to the first resilient arm 320. Increased pressure on the cover 200 causes the first resilient arm 320 to flex outwardly away from the first flange 332 to permit the first tab 310 to pass around the first flange 332 until the first latching surface 314 engages the first latch engaging surface 330. The cover 200 itself may also bow or flex to some extent depending on where the closing or folding pressure is applied to the cover 200. The first resilient arm 320 is biased back toward the first flange 332 to maintain the first tab 310 in engagement with the first flange 332. Similarly and substantially simultaneously, the second bevelled surface 412 of the second tab 410 contacts the second bevelled surface 434 of the second flange 432, which is substantially rigid relative to the second resilient arm 420, so that the second resilient arm 420 is flexible outwardly away from the second flange 432 to permit the second tab 410 to pass around the second flange 432 until the second latching surface 414 engages the second latch engaging surface 430. The second resilient arm 420 is biased back toward the second flange 432 to maintain the second tab 410 in engagement with the second flange 432. The force required to engage the clasps 300 and 400 may be varied by changing the thickness and width of the first and second resilient arms 320 and 420.

The cover 200 is releasably secured over the article retention portion 110 by the clasps 300 and 400 to releasably retain articles in the body member 100 wherein the clasps 300 and 400 cooperate to prevent inadvertent release or opening of the cover 200 from over the article retention portion 110. FIG. 3 illustrates that releasing the cover 200 from over body member 100 requires disengaging the first tab 310 from the first flange 332 by outwardly flexing the first resilient arm 320 away from the first flange 332, and simultaneously disengaging the second tab 410 from the second flange 432 by outwardly flexing the second resilient arm 420 away from the second flange 432. Any forces tending to outwardly flex the first resilient arm 320 and disengage the first tab 310 from the first flange 332 tend to increase engagement between the second flange 432 and the second tab 410 thereby preventing inadvertent release of the cover 200. Similarly, any forces tending to inwardly flex the second flange 432, such as forces tending to separate the cover 200 from the body member 100, and disengage the second tab 410 from the second flange 432 tend to further or increase engagement between the first flange 332 and the first tab 310 thereby preventing inadvertent release of the cover 200. To release the cover 200 from the body member 100, the second resilient arm 420 must be flexed outwardly away from the second flange 432 while the first resilient arm 320 is flexed outwardly away from the first flange 332 wherein the cover 200 is releasable from the body member 110 to provide access to the article retention portion 110. When the cover 200 is subject to forces tending to separate the cover 200 from the body member without first outwardly flexing the second resilient arm 420, the downwardly extending second resilient arm 420 is flexed inwardly by the second latch engaging surface 430 resulting in increased engagement between the second latching surface 414 and the second latch engaging surface 430, which further prevents inadvertent release of the cover 200 from the body member 100.

While the foregoing written description of the invention enables any one skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all of the embodiments within the scope of the appended claims.

What is claimed is:

1. Apparatus for mounting and retaining an article, the apparatus comprising:

a body member having an article retention portion for retaining an article thereon;

a cover releasably disposable over said article retention portion of said body member for releasably retaining an article disposed within said article retention portion of said body member;

first latch means disposed upon said cover;

first latch engaging means disposed upon said body member for engaging said first latch means of said cover when said cover is disposed over said article retention portion of said body member;

a substantially planar latch arm, having second latch means mounted thereon, substantially coplanar with and integrally mounted upon a surface portion of said body member so as to be movable with respect to said surface portion of said body member between a latch position and a release position; and second latch engaging means disposed upon said cover for engaging said second latch means of said substantially planar latch arm of said body member when said cover is disposed over said article retention portion of said body member, wherein said first latch means and said second latch engaging means disposed upon said cover extend away from each other, and said second latch means and said first latch engaging means disposed upon said body member extend toward one another so as to prevent inadvertent release of said cover from said body member, and wherein further, said substantially planar latch arm must be moved to said release position in order to disengage said second latch means thereof from said second latch engaging means of said cover and to permit said first latch means disposed upon said cover to be disengaged from said first latch engaging means of said body member so as to permit said cover to be released from its position over said article retention portion of said body member.

2. The apparatus as set forth in claim 1, wherein:

said first latch means and said second latch engaging means are disposed upon a first end portion of said cover; and said cover is hingedly mounted at a second end portion thereof upon said body member.

3. The apparatus of claim 2, wherein:

said first latch means is disposed upon a first resilient arm extending from said first end portion of said cover, and said first latch engaging means is disposed upon a first flange on said body member; and said second latch means is disposed upon said substantially planar latch arm which comprises a second resilient arm mounted upon said body member, and said second latch engaging means is disposed upon a second flange on said first end portion of said cover.

4. The apparatus of claim 3, wherein:

said body member has an L-shaped configuration and comprises a base leg and a mounting leg having a mounting surface;

said article retention portion and said first flange are disposed upon said base leg;

said second resilient arm is disposed upon said mounting leg; and said second end portion of said cover is hingedly connected to said base leg wherein said cover is foldable over said article retention portion of said base leg.

5. The apparatus of claim 4, wherein:

said first flange has a bevelled surface for contacting a first tab of said first resilient arm and flexing said first resilient arm so as to permit engagement of said first latch means with said first latch engaging means; and said second flange has a second bevelled surface for contacting said second latch means comprising a second tab and flexing said second resilient arm so as to permit engagement of said second latch means with said second latching engaging means.

6. The apparatus of claim 5 wherein the article retention portion is a tube retention member having a partially cylindrical cavity formed by outwardly flexible resilient wall portions that permit insertion of a tubular member into the cavity and thereafter the resilient wall portions snap toward one another to capture the tubular member in the cavity, and wherein the cover is releasably securable over the tube retention member by the first and second latch and latch engaging means for releasably retaining the tubular member captured in the tube retention member.

7. The apparatus of claim 6 wherein the second resilient arm on the mounting leg is adjacent the base leg and extends toward the base leg, the first flange on the base leg is adjacent the mounting leg, the second flange on the cover is at an outermost end portion of the cover relative to the first resilient arm on the cover.

8. The apparatus of claim 6 wherein the body member and cover is a unitary member formed of a molded plastic material.

9. The apparatus as set forth in claim 6, wherein:

said article retention portion comprising said tube retention member comprises three partially cylindrical cavities for housing three tubular members.

10. The apparatus as set forth in claim 7, wherein:

said second resilient arm and said first flange are disposed upon opposite sides of a corner portion of said body member as defined between said mounting leg and said base leg which comprise said L-shaped body member.

11. A method for mounting and retaining an article, comprising the steps of:

providing a body member with an article retention portion for retaining an article thereon;

providing a cover with a first latch means;

providing said body member with a first latch engaging means for engaging said first latch means of said cover when said cover is disposed over said article retention portion of said body member;

providing a substantially planar latch arm, having second latch means mounted thereon, upon said body member such that said substantially planar latch arm is disposed substantially coplanar and integral with a surface portion of said body member, and said second latch means is movable with respect to said surface portion of said body member between a latch position and a release position, said first latch engaging means and said second latch means of said body member extending toward each other;

providing second latch engaging means upon said cover for engaging said second latch means of said substantially planar latch arm of said body member when said cover is disposed over said article retention portion of said body member and said second latch means is disposed at said latch position, said first latch means and said second latch engaging means of said cover extending away from each other so as to prevent inadvertent release of said cover from said body member when said first latch means of said cover is engaged with said first latch engaging means of said body member, and said second latch means of said body member is engaged with said second latch engaging means of said cover; and disposing said cover over said article retention portion of said body member and engaging said first latch means of said cover with said first latch engaging means of said body member, and said second latch means of said body member with said second latch engaging means of said cover, so as to releasably retain said cover engaged with said body member and thereby retain an article within said article retention portion of said body member.

12. The method as set forth in claim 11, further comprising the step of:

moving said substantially planar latch arm of said body member so as to move said second latch means thereof to said release position in order to disengage said second latch means from said second latch engaging means of said cover and thereby permit said first latch means of said cover to be disengaged from said first latch engaging means of said body member so as to permit said cover to be released from its position over said article retention portion of said body member.

13. The method as set forth in claim 11, further comprising the steps of:

providing said first latch means and said second latch engaging means upon a first end portion of said cover; and hingedly connecting a second end portion of said cover to said body member.

14. The method of claim 11, further comprising the steps of:

mounting said first latch means of said cover upon a first flexibly resilient arm;

providing said substantially planar latch arm as a second flexibly resilient arm;

flexing said first resilient arm interconnecting said cover and said first latch means as said cover is disposed over said article retention portion of said body member so as to permit engagement of said first latch means with said first latch engaging means; and flexing said second resilient arm interconnecting said body member and said second latch means as said cover is disposed over said article retention portion of said body member so as to permit engagement of said second latch means with said second latch engaging means.

15. The method of claim 11, further comprising the steps of:

forming said article retention portion of said body member as a tube retention member having a cavity and resilient wall portions;

outwardly flexing said resilient wall portions of said tube retention member so as to permit insertion of a tubular member into said cavity; and snapping said resilient wall portions of said tube retention member toward one another so as to capture said tubular member within said cavity of said tube retention member before disposing said cover over said tube retention member.

16. The method as set forth in claim 15, further comprising the step of:

providing said tube retention member of said body member with a plurality of cavities for retaining a plurality of tubular members with said plurality of cavities.

17. The method as set forth in claim 16, further comprising the step of:

providing said tube retention member of said body member with three cavities disposed in a serial array upon said body member.

18. The method as set forth in claim 11, further comprising the steps of:

providing said body member with a substantially L-shaped configuration so that said body member comprises a base leg and a mounting leg;

providing said article retention portion and said first latch engaging means upon said base leg; and providing said substantially planar latch arm and said second latch means upon said mounting leg.

19. The method as set forth in claim 18, further comprising:

hingedly connecting said cover to said base leg of said body member such that said cover is foldable over said article retention portion of said body member.

20. The method as set forth in claim 18, further comprising the step of:

providing said substantially planar latch arm and said first latching engaging means of said body member upon opposite sides of a corner portion of said body member as defined between said mounting leg and said base leg which comprise said substantially L-shaped body member.

* * * * *